UNITED STATES PATENT OFFICE.

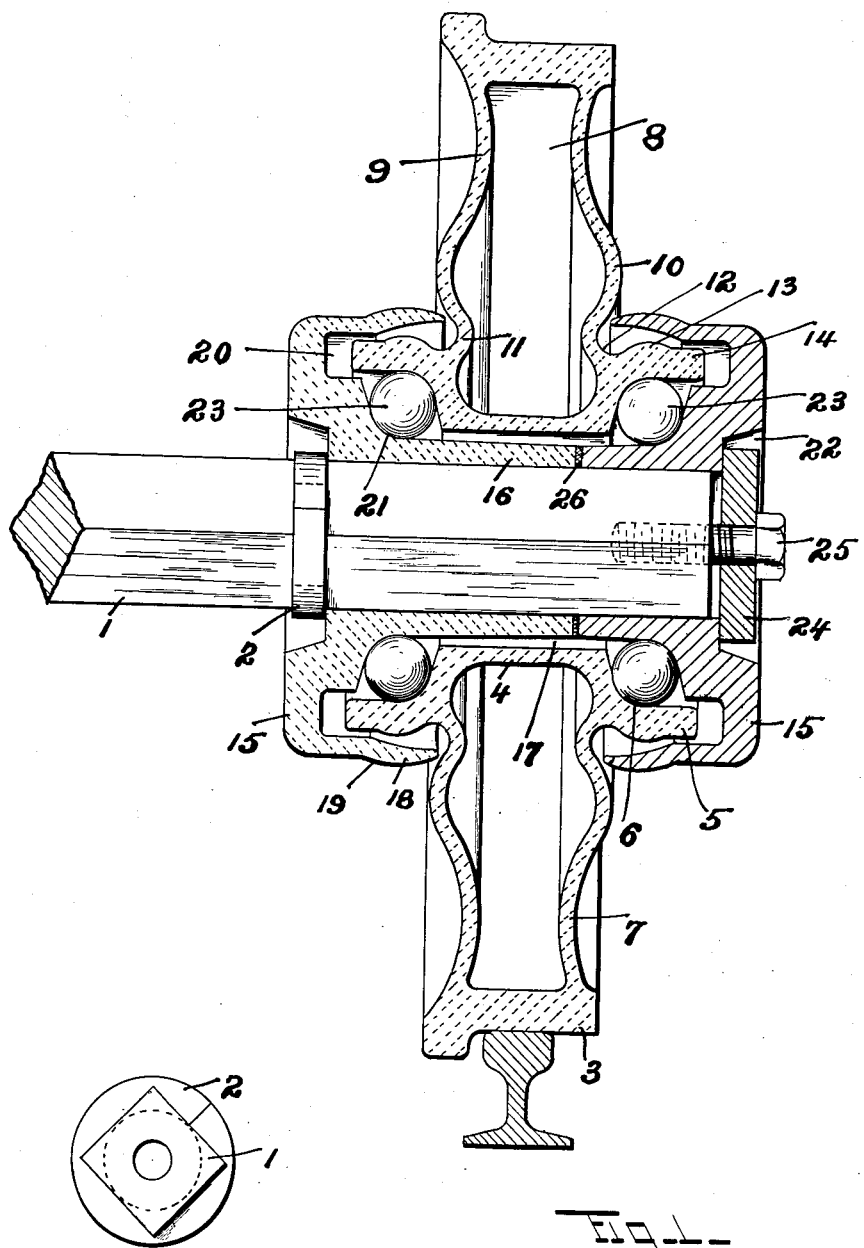

FREDRICK W. STICKLE, OF WATERBURY, CONNECTICUT, ASSIGNOR OF ONE-HALF TO EDWARD W. BEACH, OF WATERBURY, CONNECTICUT.

TRUCK-WHEEL.

No. 810,438.  Specification of Letters Patent.  Patented Jan. 23, 1906.

Application filed April 18, 1904. Renewed August 24, 1905. Serial No. 275,698.

*To all whom it may concern:*

Be it known that I, FREDRICK W. STICKLE, a citizen of the United States, residing at Waterbury, in the county of New Haven and State of Connecticut, have invented certain new and useful Improvements in Truck-Wheels, of which the following is a specification, reference being had therein to the accompanying drawings.

My invention relates to new and useful improvements in truck-wheels, and has for its object, among other things, the construction of a truck-wheel with the fewest possible parts so designed that the friction will be reduced to the minimum and the bearings protected from dirt and all foreign substances, as well as to combine the above features in a wheel that can be manufactured at the minimum cost.

To these and other ends my invention consists in the truck-wheel having certain details of constuction and combination of parts, as will be hereinefter described, and more particularly pointed out in the claims.

Referring to the drawings, which form part of this specification, and in which like numerals of reference designate like parts in both figures, Figure 1 is a transverse sectional view of my improved truck-wheel with a fragmentary portion of the axle shown therein, and Fig. 2 is an end view of the axle.

Heretofore truck-wheels of the character described that are used in foundries, mines, ovens, &c., have required more or less finishing thereon, which is usually done by inferior labor and in such a careless manner as to produce a defective wheel, as well as to materially increase its cost, and, again, none of these wheels have been provided with means for protecting the bearing parts from the sand, dirt, or other foreign substances that work into the same, so that in a short time the bearings are cut and the friction greatly increased.

In my invention I have overcome the defects of the prior art and have introduced many new and novel features in a truck-wheel which is constructed of parts that require no finishing, but are used just as they come from the mold, and the bearing-surfaces protected so that it is practically impossible for either sand, chips, dirt, or even a liquid to come in contact therewith.

In the drawings the numeral 1 designates the axle, which is preferably rectangular in cross-section, as shown, but can be made, of course, of any other shape, if desired. This axle is provided near its outer end with a collar 2, which collar is preferably made of square iron, heated and coiled around said axle and embedded in a groove therein of the same width as the said bar. The axle need not be finished, as the square steel bars, ordinarily found in the market, can be used.

The wheel is designated 3 and can have any form of rim within my invention. This wheel I prefer to cast hollow, with a central hub 4, which projects outwardly on either side of said wheel and terminates in the bearing-collars 5. The outer ends of said collars 5 are cup-shaped and are provided with the curved bearing-surfaces 6. The rim of the wheel 3 and the hub 4 thereof are connected by a web 7 upon either side of said wheel and having an open space therebetween. These webs in cross-section are curved toward and away from each other, being curved toward each other near the rim of said wheel at a point designated 9, then curving outwardly away from each other as they approach the hub, forming the rounded overhanging portions 10 adjacent to said hub, then curving inwardly at 11, then curving outwardly again and uniting with the hub, at which point there is an annular recess 12 of less diameter than the diameter of the collars 5. The collars 5 adjacent to the annular recess 12 are provided with the rounded enlargements 13, which are of greater diameter than the outer diameter of said collars at 14.

The numerals 15 designate two cones, which are substantially alike; but, as shown in the drawings, the inner cone is longer than the outer cone, a feature not material to my invention, as they can both be of the same length, if desired. These cones are constructed with an annular body portion 16, having a hole therethrough corresponding in cross-section with that of the axle 1, upon which they are held, and projecting inwardly toward each other through the hole 17 in the hub 4. The head portion of these cones is provided with an inwardly-projecting flange 18, which extends over the collars 5 and terminates at a point inside of the curved portions 10 of the web 7. The outer surface of said flanges is rounded, as at 19, for a portion of its length. Upon the inner face of said heads are the annular recesses 20, which are opposite the collars 5, and connecting the body portions 16 with the said heads are the curved portions 21, corresponding in shape with the curved surfaces 6 and forming, in conjunction therewith, two ball-races. The cones 15 are further provided in their head portions with the annular recesses 22. The curved surfaces 6 and 21 are preferably chilled, a process that is accomplished during the molding operation in a manner well known to the art. This furnishes a hard smooth practically indestructible bearing-surface for the hardened balls 23, which lie between said surfaces.

The cones are held against endwise movement by means of a plate 24 and a bolt 25, which passes through said plate and is threaded into the end of the axle. Between the inner ends of the body members 16 of the cones 15 is a fiber or other washer 26, which can be of varying thicknesses as desired. It is apparent from the drawings that when the cones are locked together by means of the bolt 25 that the wheel 3 can be rotated upon the balls 23 with the least possible friction, and the shape of the wheel-flanges is such that no dirt will be permitted to enter the bearing-surfaces, for when a foreign substance, be it either solid or liquid, strikes the web of the wheel near the rim thereof it will be shunted outward by reason of the curvature 9 in said web, but if it follows said web onto the curved portion 10 it will be thrown either outwardly over the top of the flanges 18 of the cone, and thus carried away from the bearings; but if perchance it should pass the curved portions 10 and go beneath the flanges 18 upon the cone it would enter the recess 12 and there lie, owing to its being of smaller diameter than the collars 5, until the wheel had rotated to a point where the foreign substance would drop out and away from the wheel by gravity.

Having described my invention, what I claim as new, and desire to secure by Letters Patent, is—

1. In a device of the character described comprising a wheel having a web provided with outwardly-curved portions near the base thereof, a hub formed integral therewith, and bearing-collars formed integral with each end of the hub adjacent to the outwardly-curved portions of the web, non-rotatable cones mounted within the hub provided with recesses adapted to receive the ends of the bearing-collars and integral curved flanges formed on said cones adapted to overlie the bearing-collars and extending inwardly to the web to lie beneath the outwardly-curved portions thereof, and a plurality of antifriction-balls mounted between the collars and the cones, substantially as described.

2. In combination with a wheel having a hub formed integral therewith, bearing-collars provided with curved portions formed upon said hub, and a web connecting the hub with the rim provided with outwardly-curved portions overlying the bearing-collars, non-rotatable cones provided with extensions lying within the hub and having recesses formed therein to receive the ends of the bearing-collars, integral curved flanges formed thereon extending over said bearing-collars and lying adjacent to the base of the outwardly-curved portions of the web, and antifriction-balls carried between the cones and the bearing-collars, substantially as described.

3. In a device of the character set forth, a wheel comprising an integral hub web and rim, integral bearing-collars formed at each end of the hub having exterior enlarged rounded portions adjacent to the web, said web having outwardly-curved portions overlying said bearing-collars, cone members having portions extending within the hub, integral curved flanges formed upon said cone members projecting over the curved portions of the bearing-collars and lying adjacent to the web at the base of the outwardly-curved portions thereof, and antifriction-balls mounted between the cones and the bearing-collars, substantially as described.

In testimony whereof I affix my signature in presence of two witnesses.

FREDRICK W. STICKLE.

Witnesses:
FREDERICK C. FROMM,
MARY I. TOBIN.